Sept. 18, 1956 P. E. OHMART 2,763,790
COMPARATOR
Filed April 5, 1952 3 Sheets-Sheet 1

INVENTOR.
Philip E. Ohmart.
BY
Wood, Herron & Evans.
ATTORNEYS.

INVENTOR.
Philip E. Ohmart.
BY
Wood, Herron & Evans.
ATTORNEYS.

Sept. 18, 1956 P. E. OHMART 2,763,790
COMPARATOR
Filed April 5, 1952 3 Sheets-Sheet 3
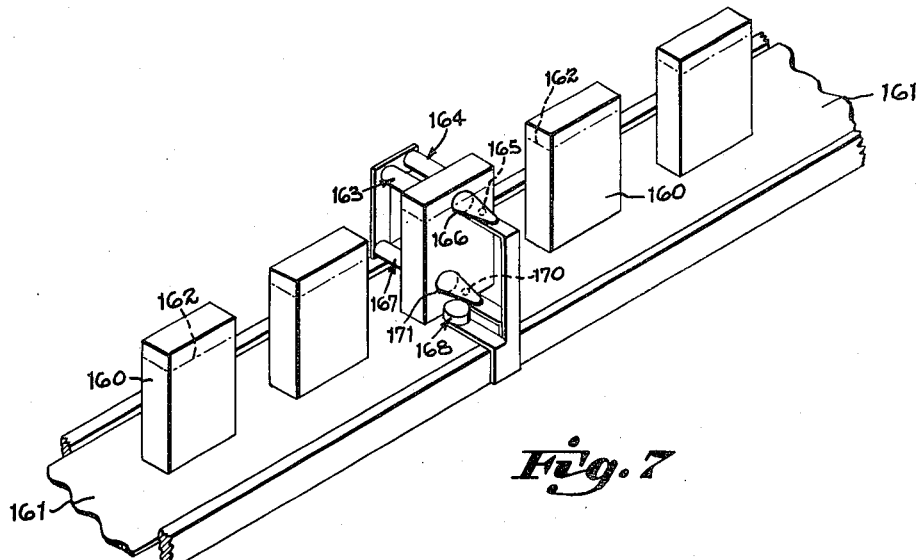
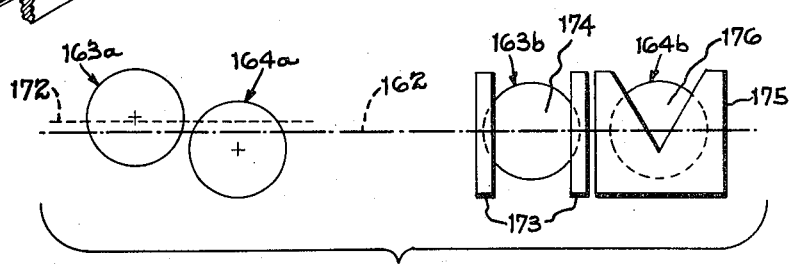
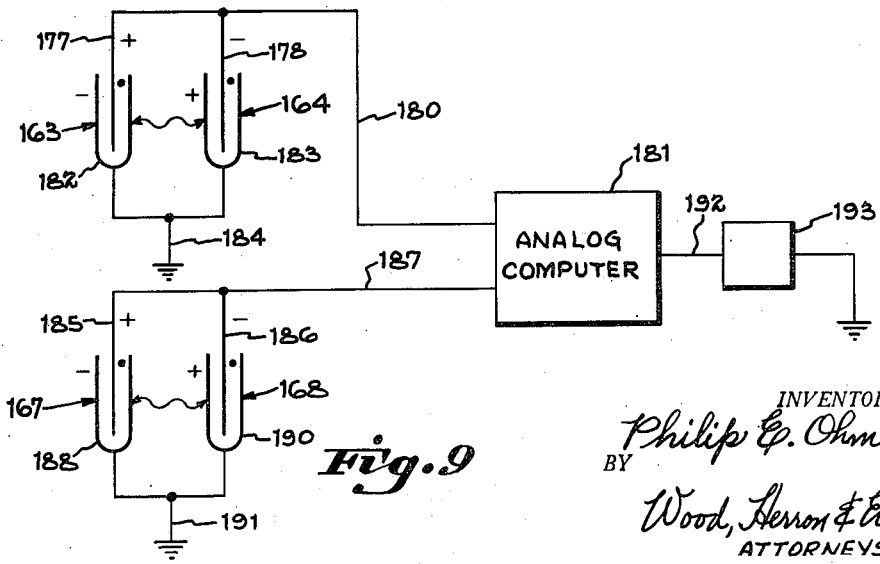
INVENTOR.
Philip E. Ohmart.
BY
Wood, Herron & Evans.
ATTORNEYS.

United States Patent Office 2,763,790
Patented Sept. 18, 1956

2,763,790

COMPARATOR

Philip E. Ohmart, Cincinnati, Ohio, assignor to The Ohmart Corporation, Cincinnati, Ohio, a corporation of Ohio Application April 5, 1952, Serial No. 280,842

25 Claims. (Cl. 250—83.6)

This invention relates to methods and apparatus for measuring variable quantities such as material thickness, film thickness, X-ray dosage, gas composition and the like. More particularly, this invention is concerned with the use of Ohmart cells to effect these and similar measurements.

There are many measurement problems for which the presently existing apparatus is inadequate, too expensive, or too inaccurate for completely satisfactory use. The problem of measuring the thickness of sheet material such as paper, linoleum, plastic, or rolled metal is typical. These and similar products are often manufactured in the form of a continuous sheet, the thickness of which is frequently checked as the material is being produced so that the manufacturing processes can be controlled to yield a uniform product. Often to establish effective control over a particular process, measurements of the product must be taken in relatively inaccessible places. This, coupled with the fact that it is highly undesirable to stop the production line or remove material samples in order to make measurements, render most of the conventional mechanical measuring methods unsatisfactory.

A somewhat similar problem is involved in the measurement of film thickness. In factories where a product is dipped or sprayed with paint or lacquer, for example, it is often desirable to maintain a close control over the thickness of the coating, for reasons both of economy and uniformity. Often the measurements must be made before the coating is completely hardened so that measuring devices of a mechanical nature depending upon contact with the material surface cannot be used without seriously damaging the finish. Furthermore, it is practically impossible to obtain rapid accurate measurements of dimensions of the order of film thickness dimensions by mechanical means.

The present invention is directed to the solution of these and many other measuring problems and contemplates an apparatus which can be placed anywhere and will give a continuous automatic indication of the desired measurement without the necessity of removing the material from the production line. No portion of the apparatus need come into contact with the material being measured, and the production line need not be stopped or even slowed down for the measuring operation.

Generally the present invention is predicated upon the concept of utilizing as an index of a variable condition, such as thickness, the effect of the attenuation of ionizing radiations, due to that condition, upon the current generated in a radiant energy electric generator, or Ohmart cell. As explained more fully in my copending applications: "Ohmart Cells For Measuring Radiation," Serial No. 259,341, filed December 1, 1951, and "Method of Converting Ionic Energy Into Electrical Energy," Serial No. 266,883, filed January 17, 1952, an Ohmart cell will tend to generate a current whenever it is exposed to radiant energy. This radiant energy may be obtained from any of a number of sources; some of the more common of these sources being constituted by radioactive material such as strontium 90, X-ray tubes and ultra-violet lamps.

As explained in my application on "Ohmart Cells for Measuring Radiation," all other factors being held constant, the current which is produced by an Ohmart cell and which will flow through an external circuit connecting the cell electrodes will vary in a predetermined manner with the density of the impinging ionizing energy. I have determined that this characteristic of an Ohmart cell is useful for purposes other than measuring radiant intensity since by arranging a source of ionizing energy and an Ohmart cell in such a manner that the density of the impinging energy varies in accordance with variations in condition to be measured, the current developed by the cell can be used to index the variable condition.

The theory of Ohmart cell operation and details of cell construction are described in greater detail in the above mentioned copending applications. It will suffice here to state that essentially a radiant energy electric generator comprises three elements, a first electrode, a second electrode, chemically dissimilar to the first and electrically insulated from it, and an ionizable gas in contact with the two. Due to the chemical asymmetry of the electrodes a field bias is created between them. When the gas, in contact with the two electrodes, is ionized by the impingement of ionizing energy, or by secondary radiations, in turn caused by the ionizing energy, there will be a discriminatory migration of the ions toward the electrodes. The positive ions will move toward the more noble electrode, and the negatively charged electrons will move toward the more active electrode. These particles will collect on their respective electrodes causing a potential difference to be built up between them.

If an external leakage path is provided between the electrodes, the electrons will pass through the external path from the negative electrode to the positive electrode where they neutralize the positive ions to form gas molecules. For each electron that is picked up by a positive ion, an additional electron will flow through the external circuit from the negative to the positive electrode. Depending upon the density of the impinging ionizing energy and the impedance of the external circuit, a unique equilibrium, or steady state, condition will be reached in which the number of electrons flowing through the external circuit will be equal to the number of ions neutralized by the positive electrode. This equilibrium condition is characterized both by the particular current generated by the cell and the particular voltage developed by it.

To illustrate how a radiant energy electric generator can be utilized to measure a varying quantity, suppose that it is desired to measure the thickness of a sheet of metal. According to the principles of this invention a source of ionizing energy can be placed on one side of the sheet and an Ohmart cell on the opposite side. The sheet will absorb a quantity of the radiant energy depending upon its density and thickness, the thicker the sheet the greater the attenuation of the radiation impinging upon the cell.

Obviously the impinging radiation will be greatest when no sheet is interposed between the source of the cell and will be minimum for the thickest sheet which is placed between them. This single Ohmart cell can be connected to a meter calibrated so that the current or voltage developed by the cell at equilibrium is correlated with the values of the varying condition, in this case thickness. Thus, the meter could be calibrated so that a given voltage output of the cell results in a reading of $\frac{1}{32}$ of an inch, another the voltage output results in a reading of $\frac{1}{16}$ of an inch etc. Hence the thickness of any unknown sheet can be determined by placing the sheet between the cell and the source and noting the meter indication.

The difficulty with such an arrangement is that appreciable inaccuracies are introduced by many extraneous factors such as changes in amplifier characteristics and variations in the intensity of the energy emitted by the source. These latter variations are due to voltage variations in the energizing circuit of an electronic source or decay of a radioactive material if that is utilized as a source. Furthermore, other variable conditions such as humidity, barometric pressure and dust collection may influence the output of the Ohmart cell, causing further inaccuracies in the measurements observed. I have determined that these difficulties may be avoided by the use of a null indicating system including a second Ohmart cell, which in effect compensates for all of the variable factors influencing the first cell except for the particular factor it is desired to measure.

Hence it is another concept of the present invention to accurately measure variable quantities by employing two Ohmart cells connected in opposition; one Ohmart cell under the influence of the variable condition being measured, and the other Ohmart cell operating under a "standard" or predetermined value of that condition. The cells are arranged so that when the variable condition is identical with the standard condition then the currents produced by the cells will cancel one another out and the total output will be zero. If on the other hand the variable condition deviates from the standard value, then this deviation will be reflected by the difference in the two currents giving rise to a "net output error signal." This signal may be amplified in any of a number of conventional manners and if measured by a suitably calibrated instrument will indicate either the amount of deviation of the variable quantity from standard or its absolute value.

To illustrate the manner in which measurements can be made by means of this arrangement, suppose that it is again desired to measure material thickness. In accordance with the principles just outlined, the material whose thickness is to be measured is interposed between one cell and its source of radiation. Simultaneously a sheet of identical material of a standard thickness is interposed between the other cell and its source of radiation. Each of these materials will absorb a certain amount of the ionizing energy emitted from the respective sources, so that in both cases the radiant intensity will be somewhat attenuated before it impinges upon the cells.

Other factors being the same, the attenuation will be dependent upon the thickness of the material interposed between the radiant source and the cell. Consequently, if both specimens are of the same thickness, and the two cells are ionized by energy emitted from the same or equivalent sources, then the intensity of the radiation impinging upon the two cells will be the same and their developed currents will likewise be equal. Since the cells are connected in opposition, their currents will cancel each other out and there will be a zero net output signal.

If, on the other hand, the sample is of a different thickness from the standard piece, the ionizing intensity from the radiation striking upon its associated cell will be greater or smaller than the radiation impinging upon the cell associated with the standard piece. In this case there will be a net output error signal produced having a polarity dependent upon whether the specimen is larger or smaller than "standard," and a magnitude dependent upon the amount of its deviation from that value. This net output error signal may then be used to operate a meter for visually indicating the difference, or may be used to control the adjustment of one or more machines to cause the material being produced to more nearly conform to "standard."

One of the principal advantages of the measuring system just outlined is that the measurements will retain their accuracy despite considerable variation in extraneous factors. The compensatory cell will generally be affected by these factors to the same extent that the measuring cell is affected, and since the output signals of the cells are in opposition, the effect of these variations will be cancelled out. In other words, the only condition tending to produce a net output error signal is the deviation of the variable quantity from its standard value. Thus, for example, while the decay of the radioactive sources may tend to reduce somewhat the sensitivity of the apparatus, the sources associated with the compensatory cell and with the measuring cell will decay concurrently and the current produced by each of the cells will diminish by an equal amount so that the net output error signal will not be affected.

A second major advantage which results from employing two opposed Ohmart cells to index a variable condition is that any deviation of the condition from its standard or reference value results in a maximum corresponding net output error signal in the external circuit. A measuring device employing opposed cells can be operated at maximum sensitivity over a wide range of variable values and will generally produce a larger change in output signal for a given change in the variable condition than will a single cell.

As explained in my copending application on "Method of Converting Ionic Energy Into Electrical Energy," the ion collection efficiency of any pair of cell electrodes is greatest when the electrodes are at relatively low potentials. The asymmetrical field of the electrodes can effectively influence all of the ions formed so long as the potential of the cell remains below the critical value (generally .5–.8 of the open circuit voltage). In this range so long as the ionizing source remains the same, the current developed by the cell will remain substantially constant irrespective of any changes in external impedance. However, should the potential of the cell build up above the critical value, the field can no longer influence all of the ions produced and the current will fall off from its constant value; the current will continue to diminish as the voltage of the cell approaches the open circuit voltage.

Furthermore, as long as a cell is operated so that its closed circuit voltage remains below the critical value, there will be a maximum change in closed circuit voltage in response to a given change in radiant intensity. Hence a cell is most sensitive to changes in the intensity of ionizing radiations when operated below the critical voltage value; this sensitivity will decrease after the developed voltage exceeds the critical value and when the developed voltage approaches open circuit voltage the cell is no longer appreciably affected by changes in radiant intensity.

When two radiant energy electric generators producing equal currents are connected in parallel opposition with an external load resistance, the positive ions formed in each cell will be neutralized by the electrons flowing from the other cell, in which they have been freed and collected. When the current output of the cells is the same, the current flow between the cells will be maximum, but no current will flow in the external circuit. Moreover, the electrodes of each of the cells will be at substantially the same potential.

When, however, the output of the measuring cell is reduced or increased so that it differs from the current output of the compensatory cell, one of the cells twill become dominant. That is, more ions will migrate to its electrodes than can be neutralized by the electrons supplied by the other cell. In this event the dominating cell will force its excess electrons through the external circuit to neutralize the excess ions collecting at its positive electrode. Simultaneously, the potential of the dominant cell will rise to the magnitude required to send these electrons through the circuit. This potential rise of the dominant cell, or the current flow through the external circuit, can be used as the net output error signal of the two cells. Obviously the polarity of the voltage and the direction of current flow will depend upon whether the measuring cell or compensatory cell dominates, and their magnitude will reflect the difference in the output of the two cells.

By selecting the reference value of the variable condition so that that condition will not depart excessively from this value, no matter which cell becomes dominant, it will still operate at a potential below its critical value and the closed circuit voltage will always change by a maximum amount for any change in the variable condition.

Another of the principal features of this invention is that the measuring system has a null point coincident with the point of "standard" indication. In other words, in the preferred embodiment when the magnitude of the variable condition coincides with the "standard" value, the net output error signal from the two opposed cells will be zero. Consequently, amplifier instability with respect to either gain change or zero drift will not manifest itself in errors of indication.

A still further advantage of this system is the ease with which it may be adapted to maintain its null indicating characteristics even though the quantities being measured vary over a wide range. In order to accomplish this result, it is only necessary to change the standard specimen associated with the compensatory cell. For example, if a factory is making one production run of material 1/8 of an inch thick, and it is desired to change the production line over to produce material 3/32 of an inch thick, it is only necessary, in order to retain all of the advantages of the null indicating system, to change the standard specimen from one 1/8 of an inch thick to one 3/32 of an inch thick.

Thus far, the consideration of the utility of these cells has been limited to the measurement of quantities which are directly accessible. It is another concept of this invention to use two or more cells, or groups of cells, to measure a quantity which is not in itself directly measurable. For example, one device in which the output signals of two groups of cells are utilized to measure a quantity not directly accessible, is a high speed weighing machine. A problem recurrent throughout many industries is that of weighing packaged products in order to control the product's weight within predetermined limits. In many cases the unit production is so high that it is extremely difficult to weigh each package without consuming a completely inordinate amount of time. Typical products of which this a true are packaged cereals and other packaged granular products such as sugar, soap and flour. In many plants these products come off the packing line at the rate of several a second. Obviously no mechanical weighing device depending upon spring displacement or the like can give a rapid enough indication to measure these products as they arrive at the end of the conveyor.

I have determined that by using two sets of measuring cells, the one set being utilized to measure the volume (by measuring the heighth of the product within the container) and the other being arranged to determine density, a high speed weighing machine may be constructed which will give an indication of the weight of each package as it passes along the conveyor. In order to accomplish this result one signal, correlated with density, and the other signal, correlated with volume, are fed to an analog computer, or other multiplying device, where they are used to produce a new voltage which can be correlated directly with the package weight. The output of the analog computer in the form of this new voltage may be used to operate a properly calibrated meter to yield a visual indication, or may be used to actuate a knocker arm to automatically remove improperly filled containers from the conveyor.

The present invention is not limited, however, to the measurement of quantities by the attenuation of radiation due to the absorption of energy by a material interposed between a source and its associated cell. The use of a measuring cell and an opposed compensatory cell may be extended to the measurement of many additional quantities by means of other varying effects accompanying variations in the quantity to be measured. For example, such quantities as film thickness and alloy composition may be measured by comparing the back-scattered radiation rather than the penetrative radiation.

The portion of the energy impinging upon a surface which is "reflected" back in the form of back-scattered radiation is dependent upon the characteristics of the surface material. For example, if two identical pieces of material are coated with paint films of differing thicknesses, the portion of the impinging energy which is reflected or back-scattered from each will be dependent upon the thickness of the respective films. Likewise, if the films are of the same thickness but of differing densities, the portion of back-scattered radiation will be different for each film.

It is another object of this invention, therefore, to provide a method of measuring a variable condition which involves arranging one Ohmart cell so that energy is reflected onto it from a specimen standardized with respect to some condition such as film thickness or alloy composition, and a second cell so that it receives the back-scattered radiation from a material whose condition is to be determined. The two cells are connected in opposition and their net output error signal is used to yield an indication of the deviation of the unknown condition from its "standard" value.

Another effect by which a measuring cell and compensatory cell, connected in opposition, can be used to measure a variable quantity is illustrated in a gas analyzer. In such a device one Ohmart cell is filled with gas of standard composition and the unknown gas is passed through the measuring cell. By connecting the cells in opposition their net output error signal can be used to give an indication of any deviation of the variable gas from standard composition.

It will be observed that in each of these devices the compensating cell performs two functions, namely it compensates for variations in extraneous conditions so that these variations are not reflected as measurement errors, and secondly it establishes a reference or "standard" value for the variable quantity being measured. While in the previous description I have referred to the measuring and compensatory cells as being constituted by two cells, it will be understood that the measuring cell and the compensatory cell may be built in the form of a unitary structure or a "compound" cell. In such a case the two portions of the cell in electrical opposition still function independently as a measuring cell and as a compensatory cell.

These and other objects and advantages of the present invention can be more clearly understood from a consideration of the following detailed description of the drawings.

In the drawings:

Figure 7 is a diagrammatic perspective view of a high speed weighing machine built in accordance with the principles of this invention; the wiring is omitted from this view for purposes of clarity.

Figure 8 is an end view of the level measuring cells employed in the high speed weighing machine shown in Figure 7.

Figure 9 is a circuit diagram of the high speed weighing machine shown in Figure 7.

Figure 1:
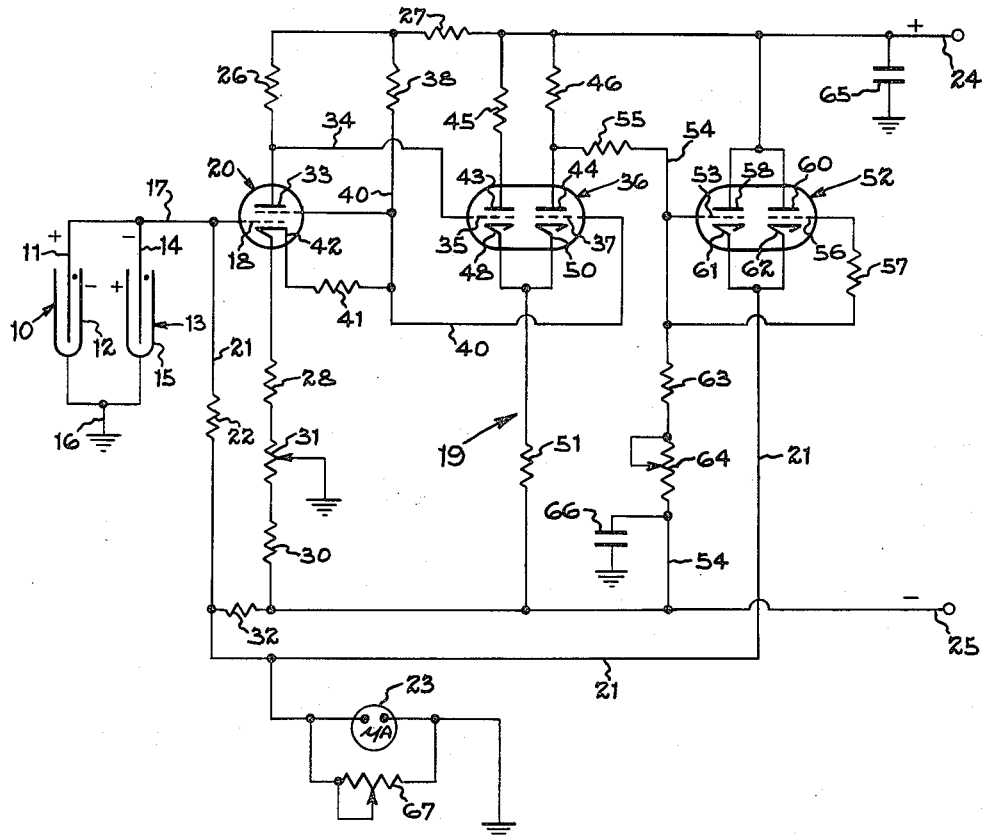
Figure 1 is a circuit diagram of the measuring apparatus of this invention including two radiant energy electric generators, or Ohmart cells connected in opposition and means for measuring their net output signal as an index of a variable condition.

Figure 1 shows one type of circuit in which a measuring cell and a compensatory cell, connected in opposition, can be used to give a meter indication of a variable condition. As shown in this diagram, a first radiant energy electric generator, or measuring cell 10 consisting of a positive electrode 11 and a negative electrode 12 is connected in parallel opposed relationship with a second radiant energy electric generator, or compensatory cell 13, including a negative electrode 14 and a positive electrode 15. These cells are preferably grounded as at 16, and a common lead 17 is connected to the grid 18 of a grid control vacuum tube such as tetrode 20, which constitutes the first tube of a zero impedance amplifier 19. Lead 17 is also grounded through conductor 21, load resistance 22 and microammeter 23.

Measuring generator 10 is arranged so that it is influenced by the variable condition to be determined; for example a material of unknown thickness may be interposed between the cell and its associated source of radiation so that the energy impinging upon the cell will be attenuated in accordance with the thickness of the material. Compensatory generator 13, on the other hand, is arranged so that it is operated under the influence of a fixed or reference value of the variable condition. However, this cell is preferably subjected to the same extraneous variables as the measuring cell. Preferably these cells are constructed to have substantially the same response characteristics so that no matter what "standard" or reference value is associated with the compensatory cell, when the variable condition is of the same value the signals from the two cells will be of equal magnitude (but of opposite polarity).

The plate cathode circuit of tube 20 is connected across the positive and negative lines 24 and 25 of an external voltage source (not shown) through resistances 26, 27, 28 and 30 and variable resistance 31. Lead 21 and line 25 are joined by resistance 32. Plate 33 of tube 20 is connected through lead 34 to one grid 35 of a double triode 36; the other grid 37 of this triode is tied to the positive line 24 through resistance 38 and lead 40. Resistance 41 interconnects cathode 42 of tube 20 and lead 40. Plates 43 and 44 of double triode 36 are connected to positive line 24 through resistances 45 and 46 respectively. Cathodes 48 and 50 are tied together and are returned to negative line 25 through resistance 51.

A second double triode 52 has one grid 53 connected to plate 44 through lead 54 and resistance 55. The other grid 56 of this tube 52 is also connected to lead 54 through resistance 57. Plates 58 and 60 of tube 52 are connected to positive line 24. Cathodes 61 and 62 are joined to line 21 and returned to the negative lead 25 through resistance 32. Lead 54 is also connected to negative line 25 through resistance 63 and potentiometer 64. Line 24 and lead 54 are respectively grounded through capacitors 65 and 66. Adjustment potentiometer 67 is connected across microammeter 23.

In operation, if the variable condition influencing measuring cell 10 deviates from the reference value influencing cell 13, an output error signal will result. This signal will have a polarity dependent upon the relative magnitudes of the variable and reference values and will have a magnitude dependent upon the disparity of the two. This output error signal is applied to load resistance 22 and to tube 20 of a zero impedance amplifier. This amplifier is characterized by the fact that its output, which is applied to the opposite end of the load resistance 22 is always of such polarity and magnitude as to reduce the voltage drop across the load resistance to zero. The output signal of this amplifier may be measured as by microammeter 23. This meter is preferably calibrated directly in units of the condition being measured such as inches or Roentgens, and gives a visual indication of the magnitude of this condition.

Figure 6:
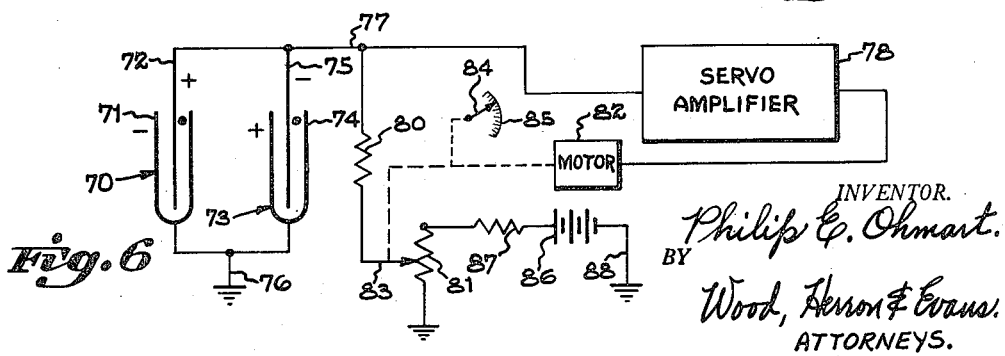
Figure 6 is a diagrammatic view showing two Ohmart cells connected in opposition and a feed back amplifier for operating an indicating mechanism for indexing a variable condition.

Figure 6 discloses a second method in which two Ohmart cells, connected in opposition, may be used to measure a variable condition. As shown, measuring cell 70, including a negative electrode 71 and positive electrode 72, is connected in parallel opposed relationship with compensatory cell 73, including positive electrode 74 and negative electrode 75. Electrodes 71 and 74 are preferably grounded as at 76, and a common lead 77 is connected to a servo amplifier 78 and to a load resistance 80. The other end of resistance 80 is grounded through tap 83 and variable resistance 81. The output of the servo amplifier, which may be of any appropriate type, is applied to motor 82. The motor drives both tap 83 of variable resistance 81 and pointer 84 of gage 85. One end of resistance 81 is connected to a positive voltage source 86 through resistance 87, the negative end of voltage 86 being grounded as at 88.

Just as in the embodiment shown in Figure 1, if the variable condition affecting the output of measuring cell 70 differs from the reference value affecting cell 73, a net output error signal will be produced. This signal is applied to the servo amplifier, the output of which drives motor 82 in such a direction that the voltage introduced through tap 83 just balances out the net output error signal reducing to zero the voltage drop across the load resistor. Simultaneously pointer 84 is driven so that it indicates on gage 85 the difference of the variable condition from standard or alternatively its absolute value.

Figure 2:
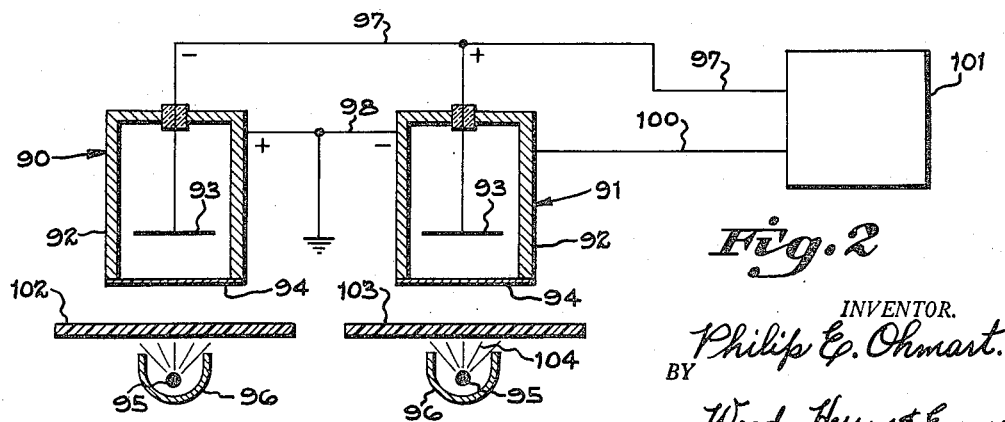
Figure 2 is a diagrammatic view of two cells arranged to measure material thickness.
Figure 3:
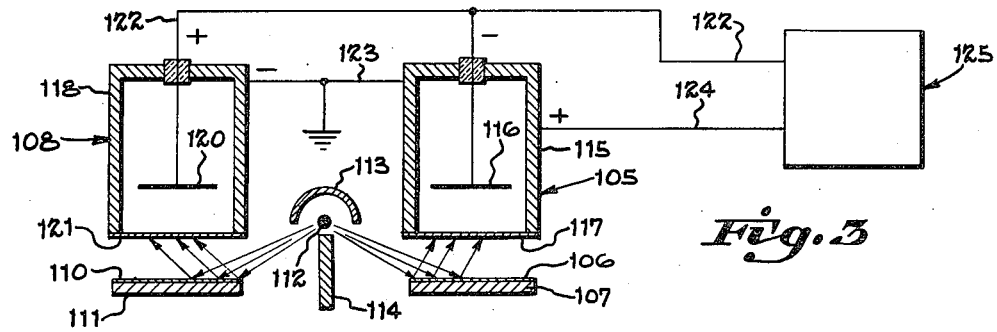
Figure 3 is a diagrammatic view of two cells arranged to measure film thickness by the back-scatter method.

Figure 2 shows the manner in which two Ohmart cells may be connected for measuring the thickness of a sheet material. As shown, two Ohmart cells 90 and 91 are connected together in such a manner that their polarities are opposed to one another. These cells are indicated diagrammatically and may be of any conventional construction. One type of cell which could be used for example, is shown in Figure 3 in my application on "Ohmart Cells for Measuring Radiation," S. N. 259,341, filed December 1, 1951.

Basically, these cells include first electrode 92 which is shown diagrammatically as being constituted by the casing. In practice this electrode may be constituted by a metallic foil, by a metal or metallic oxide coated on the casing or by a plate or series of plates disposed within the casing. The second electrode 93 is also disposed interiorly of the casing and is insulated both from it and from the first electrode. This electrode also may be constructed in any of a number of shapes, for example, any of those shown in my copending application above referred to. An ionizable gas is sealed within the casing and preferably a thin window member 94 is placed over the bottom of the cell and disposed in the direction of the ionizing source in order to facilitate entrance into the cell of the ionizing radiations.

As shown in Figure 2, the ionizing source is constituted by a piece of radioactive material 95 which is provided with a shield 96 to prevent radiation in undesirable directions. Cells 90 and 91 are connected in opposition to one another through leads 97 and grounded lead 98. Leads 97 and 100 connect the cells to a measuring or controlling apparatus indicated at 101. This apparatus may be of the form shown at 19 in Figure 1 or it may be of any other suitable type for either indicating the thickness being measured or for adjusting some device whereby the thickness of the material being produced is altered to more nearly conform to standard.

The indicating or controlling apparatus operates in response to the net output error signal of the two cells supplied to the apparatus through leads 97 and 100. Variations in the net output error signal occur whenever there is a difference between the thickness of the reference specimen 102 interposed between radiant source and cell, and the thickness of the piece being measured 103, which is passed between cell 91 and radiant source 104.

The current generated by each cell varies in accordance with the intensity of the radiation impinging upon it, and this intensity is in turn affected by the thickness of the material interposed between the cell and its radiant source. The greater the attenuation of ionizing intensity due to absorption by the sheet material, the less the current produced by the measuring cell and conversely the less the attenuation, the greater the current produced by the cell. By opposing this current with the current produced by the compensatory cell a net output error signal is obtained which is directly correlated with the deviation of the variable thickness from standard.

Figure 3 shows one way in which two Ohmart cells may be connected in opposition and used to measure film thickness, for example, the thickness of a paint coating on a metal plate. As shown, compensatory cell 105 is mounted over a standard specimen consisting of a paint film 106 of a predetermined thickness applied to a metal plate 107. A measuring cell 108 is mounted above the film whose thickness is to be determined. For reasons to be explained later, the thickness of the standard film 106 is made the same as the thickness which it is desired to maintain film 110, and plate 111 is constructed of the same material as plate 107. A source of radioactivity 112, preferably a beta emitter, is mounted so that the radiation therefrom impinges upon both specimens. A shield 113 is provided for preventing radiations from the emitter directly impinging upon the cells. Preferably a second shield 114 is disposed between the specimens to prevent any secondary radiation from one specimen striking the cell associated with the other specimen.

Cell 105 includes a casing 115 having an electrode associated therewith, and a second electrode 116 chemically dissimilar from the first electrode. An ionizable gas is placed in contact with the two electrodes and a window 117 is provided for admitting the rays back-scattered from the paint surface.

Similarly, cell 108 includes a casing 118 having one electrode associated with it, a second electrode 120 dissimilar from the first, a window 121 for admitting radiations and a gas in contact with the electrodes. The two cells are connected in opposition by means of lead 122 and grounded conductor 123. Leads 122 and 124 apply the net output signal of the cells to an indicating or controlling mechanism shown generally at 125.

Preferably the measuring apparatus is arranged so that the standard specimen associated with cell 105 includes a paint film of the same thickness it is desired to maintain in the unknown specimen; furthermore, backing plate 107 is of the same material as backing plate 111. The cells are so constructed that for an equal amount of incident radiation they will produce equal but opposite potentials. Thus when the thickness of film 110 is equal to that of film 106, the same quantity of radiation will be reflected back into cell 105 as is reflected back to cell 108, and the output of these two cells will be equal but opposed so that the net output error signal will be zero.

If, however, the thickness of film 110 deviates from the thickness of film 106, a net output error signal having a polarity dependent upon the direction of deviation and an amplitude dependent upon the magnitude of the deviation will be applied to the recording or control apparatus. This apparatus can be of the form shown in Figure 1 or Figure 6, and can be used to give a visual indication of the thickness of film 110; or on the other hand the output from apparatus 125 can be used directly to control a manufacturing process to change the thickness of the film 110 being applied. The same principles and general arrangement employed in this embodiment can be used to determine the thickness of metallic films, non-metallic films such as plastic, and also for analyzing alloys, and measuring properties of liquids by comparing absorption.

Figure 4:
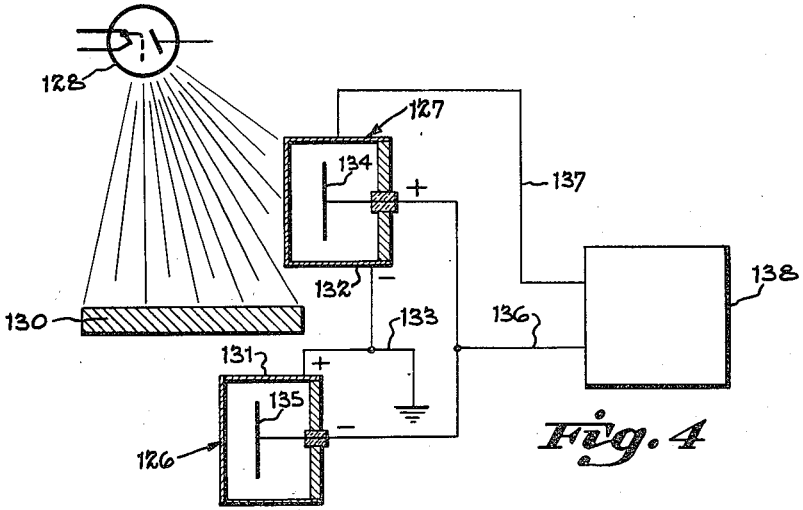
Figure 4 is a diagrammatic view showing two cells arranged to measure X-ray dosage.

An opposed measuring cell 126 and compensatory cell 127 can be used to measure X-ray dosage as illustrated in Figure 4. As shown, an X-ray tube 128 serves as a source of radiation which strikes absorber 130. A portion of the radiation striking the absorber penetrates and enters measuring cell 126, ionizing the gas therein. The X-rays also impinge upon compensatory cell 127. Cells 126 and 127 are arranged in a parallel opposed relationship, one set of electrodes 131 and 132 being grounded as at 133, and the insulated electrodes 134 and 135 being connected to lead 136 which, together with lead 137, furnishes the input for the recorder or controller apparatus 138.

When being used to measure the thickness or average atomic weight of absorber 130, cells 126 and 127 are arranged geometrically and are constructed with respective sensitivities so that when an absorber of "standard" thickness or of "standard" atomic weight is placed between them, a zero net output signal will result. If the material thickness is varied or if the atomic weight varies from the predetermined standard, then a corresponding net output error signal will be applied to the recorder or controller.

Another use for such a device would be for controlling the X-ray dosage to individuals being given X-ray therapy. In such an installation, cells 126 and 127 are adjusted so that zero output current results when no object is between them. Then when an individual being treated is placed between the two cells, the current produced will be directly correlated with the quantity of X-rays being absorbed by his body. This signal may be used to control the X-ray machine or to give a visual indication of the quantity of X-rays being absorbed.

Figure 5:
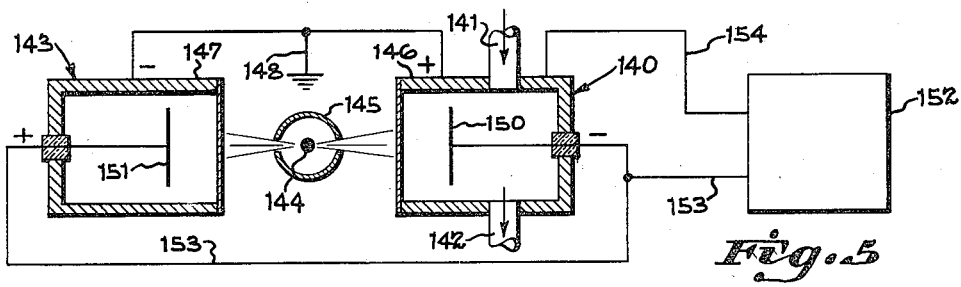
Figure 5 is a diagrammatic view showing the manner in which Ohmart cells can be connected for gas analysis purposes.

Figure 5 discloses the manner in which two Ohmart cells may be connected in opposition and used for gas analysis purposes. As more fully explained in my copending application on "Method for Converting Ionic Energy Into Electrical Energy," the current generated in any particular Ohmart cell, when exposed to a given flux density, will vary with the composition of the filling gas surrounding the electrodes. This characteristic can be utilized to construct a gas analyzer by comparing the current generated by a cell filled with a known gas to that generated by a cell filled with an unknown gas.

In the arrangement shown, measuring cell 140 is filled with the gas to be sampled. This gas is introduced through pipe 141 and emerges through pipe 142. Compensating cell 143 is filled with a gas of known composition. The gas in both cells is ionized by the impingement of radiation from source 144 disposed between the cells and shielded by shield 145.

The cells are connected in a parallel opposed relationship, electrodes 146 and 147 being grounded as at 148, and insulated electrodes 150 and 151 being tied together and connected to the recording or controlling instrument 152 through lead 153. The other input lead of the recorder is constituted by wire 154. The cells are preferably constructed so that their net output error signal is zero when the gas in each of the cells is of identical composition. At other times the output error signal from the two cells will be a function of the deviation of the gas sample from "standard" composition, and can be used to give a visual indication of the composition or can be used to make corrective adjustments in other devices.

Figures 7, 8 and 9 show how two pairs of Ohmart cells may be utilized to construct a high speed weighing machine. As shown in Figure 7, a series of packages 160, filled with a granular product such as cereal, move along a conveyor 161 in rapid succession. The height to which these boxes are filled with material is indicated (in broken lines) by the numeral 162. One pair of Ohmart cells 163 and 164 are disposed at a height generally coinciding with the level 162, and are energized from a radioactive source 165 mounted within shield 166, shield 166 being disposed on the opposite side of the containers from the cells. A second set of Ohmart cells 167 and 168 are energized by a source of radioactivity 170 which is preferably a gamma emitter. Source 170 is shielded by a member 171 which is provided with one window facing cell 167 and a second window facing cell 168. This second pair of Ohmart cells are used to measure the density of the product in a manner explained below.

The level measuring cells 163 and 164 are shown diagrammatically in Figure 8. Two of the ways in which these cells can be arranged are shown. In one arrangement the cells are disposed adjacent one another, one cell 163a having its center disposed above the mean level of the material within the containers (indicated by line 162) and the other cell 164a having its center below this line. The source of radioactivity energizing these cells is preferably a beta emitter and consequently that portion of the cells lying below the heighth 162 of any particular package will not effectively be ionized since the beta radiation will be stopped by the contents of the package.

Cells 163a and 164a are connected in opposition, and are preferably constructed so that their net output error signal is zero when the level within any package coincides with the mean level 162. It can be seen that an unbalance in the output of the two cells will be created should the level rise to the height indicated at 172, for example. This unbalance is due to the fact that while less radiation is striking both of the cells, the decrease in the radiation striking cell 164a is proportionally greater than the decrease in that striking cell 163a. Consequently the signal from this cell will change by a greater amount than will the signal of cell 163a, giving rise to a net output error signal. The same will be true should the level in a particular package drop, except that in this case the polarity of the error signal will be reversed.

The second method of obtaining a current correlated with the level of the packaged material involves placing two cells in substantially the same position relative to the mean level and shielding each so that it has an exposed area of different configuration from the exposed area of the other. As shown, cell 163b is provided with a shield 173 which functions to effectively stop the beta radiation, except for the central rectangular area indicated at 174. Cell 164b is provided with a shield 175 having a generally triangular opening 176 for permitting the rays from source 165 to impinge upon the cell. Again it can be seen that if the cells are arranged so that there is a zero net output signal when the level in any package coincides with the mean level 162, then the signal will vary from zero should the level in a particular package be above or below this line. The differential change in the output of the two cells giving rise to this net output error signal is due to the fact that a change in level causes the energy impinging upon each of the cells 163b and 164b to change by different amounts. Thus cells 163b and 164b produce a signal which varies in strict accordance with the level of the packaged product.

The density measuring cells 167 and 168 are also connected in opposition and are constructed in such a manner that for a predetermined density of packaged material the net output signal is zero. Should the density vary from this value, the net output signal will vary accordingly and its magnitude will give an accurate indication of the actual density of the material. In order to secure sufficient penetration of the packaged material, these cells are preferably energized from a gamma emitter.

Figure 9 illustrates the manner in which the level measuring cells 163 and 164 and the density measuring cells 167 and 168 are connected in order to obtain an indication of the total weight of the packaged material. As shown, the positive electrode 177 of cell 163 and the negative electrode 178 of cell 164 are connected to lead 180 which functions as one input lead of an analog computer 181. Negative electrode 182 of cell 163 and positive electrode 183 of cell 164 are grounded as at 184. Similarly, electrodes 185 and 186 of cells 167 and 168 are conected to input lead 187 of the analog computer. Electrodes 188 and 190 of cells 167 and 168 are preferably grounded as at 191.

Since weight is a function of volume multiplied by density, the function of the analog computer 181 is to electrically multiply the signals representing these two quantities, yielding a new electrical quantity which varies as their product. This electrical quantity can readily be correlated with the weight of the material contained within any package and can be fed through lead 192 to a visual indicating instrument 193 or can be amplified and used to actuate a kicker arm to remove from the conveyor 161 any of the packages 160 having material whose weight does not fall within the preassigned limits.

It should be here noted that level measuring cells, of the type employed in the weighing machine, can be used separately to measure the height of other quantities such as liquid level, grain level and the like. When being so used the cells are arranged so that the height of the material being measured causes a different change in the intensity of the ionizing energy impinging upon each of the cells. The two cells are connected in parallel opposition and their net output signal is applied to a recording or indicating apparatus in the same manner as any of the other pairs of cells. Also, shields of a type similar to those disclosed in conjunction with the level measuring cells can be employed with cells used for other measuring purposes. That is, in order to establish a reference condition for a variable, such as material thickness, it is possible to shield a portion of the compensatory cell exposed to the energy source, thereby attenuating the radiant energy impinging upon the cell in somewhat the same manner as if a piece of material of standard thickness was interposed between the cell and source.

When producing a pair of matched cells to be used together as a measuring and compensatory cell, it is highly desirable to adjust them so that their output signals will be identical when the cells are influenced by the same conditions. This adjustment may be accomplished by operating the cells under the same conditions and comparing their signal outputs with each other, or with that of a third cell. If one of the cells does not give the desired response, one of its field variables such as the electrode spacing, filling gas pressure or the filling gas composition can be changed until the cell develops the desired signal. The effect of these field variables on cell response is set forth in greater detail in my copending application above referred to on "Method of Converting Ionic Energy Into Electrical Energy."

I would like to emphasize that while the Ohmart cells in any of the above devices are connected in parallel opposition with respect to the load and measuring circuit, they are preferably connected in direct shortcircuit relationship with one another. That is, preferably the plus and minus terminals of the measuring and compensatory cells are connected together with as little impedance between them as possible. While such a connection would lead to the rapid destruction of any other type of cell, it does not adversely affect an Ohmart cell. Hence, these cells may be connected in this manner for many years, and in fact, if the sources of ionizing energy are maintained at adequate levels, the measuring apparatus will last indefinitely.

Having described my invention, I claim:

1. A measuring device comprising a measuring radiant energy electric generator and a compensatory radiant energy electric generator, said generators being connected in parallel opposed relationship, the output of said measuring generator being influenced by a variable condition to be measured, the compensatory generator being operated under the influence of a standard value of that condition, and means for measuring the net output signal of the generators to index the variable condition.

2. A measuring device comprising a measuring radiant energy electric generator and a compensatory radiant energy electric generator connected in parallel opposition, said measuring generator being operated under the influence of a variable condition, the compensatory generator being operated under the influence of a standard value of that condition, said compensatory generator and said measuring generator being arranged so that their net output signal is zero when the variable condition coincides with its standard value.

3. In a measuring system including a first radiant energy electric generator operated under the influence of a variable condition, a source of ionizing energy associated with said generator, a compensatory generator connected in parallel opposition to the first generator and operated under the influence of a predetermined value of the said condition whereby said compensatory generator is effective to establish a reference value of the variable condition and to compensate for substantially all of the extraneous conditions influencing said measuring generator.

4. A device for measuring a variable condition, said device comprising a plurality of radiant energy electric generators, said generators being arranged in pairs, each of said pairs being adapted to measure one of two independent quantities, the net output signals of said each pair of generators being applied to a computing device, whereby a new electrical quantity is generated, said quantity being correlated with a third variable not directly observed.

5. Apparatus for measuring the thickness of sheet material, said apparatus comprising a measuring radiant energy electric generator and a compensatory radiant energy electric generator, a source of ionizing radiation associated with each of said generators, said generators being connected in parallel opposed relationship, said compensatory generator having a sheet of standard thickness interposed between it and its associated source of radiation, said measuring generator having a variable sheet material to be measured disposed intermediate it and its associated source of radiation, means for measuring the net output signal of said generators as a measure of the disparity between said variable sheet thickness and said standard thickness.

6. A method of measuring a variable quantity, which method comprises disposing a first radiant energy electric generator relative to a source of ionizing radiation so that the condition to be measured affects the amount of radiation impinging upon said generator, disposing a second radiant energy electric generator with respect to a source of ionizing radiation so that the radiant intensity impinging upon said generator is attenuated by an amount corresponding to a standard value of the variable condition, and connecting the first generator and the second generator in parallel opposed relationship whereby a net output signal is produced by said generators which is dependent upon the deviation of the variable condition from its standard value, and measuring said net output signal to indicate the value of said variable condition.

7. A method of measuring thickness, which method comprises connecting a measuring radiant energy electric generator and a compensatory radiant energy electric generator in a parallel opposed relationship, providing a source of ionizing radiation for said generators, disposing the material whose thickness is to be determined intermediate the measuring generator and its associated source of radiation, and disposing a quantity of material of a standard thickness intermediate the compensatory generator and its associated source of radiation, comparing the output signals of said generators to obtain a net output error signal and employing said net output error signal to operate an apparatus for indicating the thickness of said variable material.

8. A method of measuring film thickness, said method comprising connecting a measuring radiant energy electric generator and a compensatory radiant energy electric generator in parallel opposed relationship, disposing the film to be measured relative to said measuring generator and its associated source of ionizing radiation whereby energy is back-scattered from said film to impinge upon said measuring generator, disposing a film of standard thickness relative to said compensatory generator and its associated source of ionizing radiation so that radiant energy from said source is back-scattered by said film onto the compensatory generator, comparing the output signals of the generators to obtain a net output error signal which is a function of the deviation of the variable film thickness from its standard value, and applying the net output error signal to an electrically responsive device for indicating the film thickness.

9. A method of measuring X-ray dosage, said method comprising connecting a compensatory radiant energy electric generator and a measuring radiant energy electric generator in parallel opposed relationship, disposing said compensatory generator relative to the source of X-ray radiation so that the radiation from said source directly impinges upon said compensatory generator, disposing the measuring generator so that the material being X-rayed attenuates the radiations from said source impinging upon said measuring generator, comparing the output signals from said generators to obtain a net output error signal which is a function of the quantity of X-ray radiation absorbed by the material being X-rayed, and applying the net output error signal to an electrically responsive device for indicating the X-ray dosage.

10. A method of analyzing gases, said method comprising connecting a compensatory radiant energy electric generator and a measuring radiant energy electric generator in parallel opposition, providing said compensatory generator with a filling gas of known composition, inserting gas of unknown composition into said measuring generator, irradiating each of said cells with ionizable radiations, comparing the output signals of said generators to obtain a net output error signal, applying said net output error signal to an apparatus for indicating deviation of the unknown gas composition from the known composition of the gas in said compensatory generator.

11. A method of measuring a variable quantity comprising connecting a first pair of radiant energy electric generators in parallel opposed relationship, operating one of said generators under the influence of a variable condition, operating the other of said generators under the influence of a reference value of that condition, comparing the output signals of said generators to obtain a net output error signal as an indication of the value of said variable condition, connecting a second pair of radiant energy electric generators in a parallel opposed relationship, operating one of said generators in response to a second variable condition and operating the second of said generators under the influence of a reference value of said second condition, comparing the output signals of said second pair of generators to obtain a net output error signal correlated with the value of said second variable, applying the net output error signal from said second pair of generators and the net output error signal from the first pair of generators to a device for multiplying said signals to obtain a third signal as an index of a third variable condition not directly measured.

12. A method of measuring the weight of packaged material, said method comprising passing said packaged material intermediate a source of ionizing radiation, and a first pair of radiant energy electric generators adapted to develop an output signal dependent upon the height of material within said package, passing said packaged material between a second radiant energy electric generator and its associated source of radiation whereby said generator develops a signal correlated with the density of said packaged material, applying said first signal and said second signal to a device adapted to generate a third signal dependent upon the product of the first two signals, and using said third current to operate an indicating mechanism.

13. A device for measuring X-ray dosage, said device comprising a measuring radiant energy electric generator, said measuring generator being disposed relative to the material being X-rayed so that the material absorbs a portion of the radiation from the X-ray machine and thereby attenuates the density of the ionizing radiation impinging upon the generator, a second compensatory radiant energy electric generator disposed relative to said X-ray source so that the radiations from said source directly impinge upon said generator, said generators being connected in parallel opposition, and means for measuring the net output signal of said generators as an index of the quantity of X-rays absorbed by said material.

14. A method of producing a matched pair of radiant energy electric generators for use as a compensatory generator and measuring generator in a comparator device, said method comprising operating each of said generators under the same conditions, comparing the output signal from one of said generators with the output signal from the other of said generators, and adjusting one of the field factors including electrode spacing, filling gas pressure or filling gas composition of one of said generators until that generator gives the desired response.

15. A method of producing a matched pair of radiant energy electric generators for use as a compensatory generator and measuring generator in a comparator device, said method comprising operating the generators under similar conditions, comparing the output signal of each of said generators with a standard output signal, and adjusting one of the field factors including electrode spacing, filling gas pressure or filling gas composition of said generators until each generator gives the desired response.

16. A method of controlling a variable quantity, which method comprises disposing a first radiant energy electric generator relative to a source of ionizing radiation so that the condition to be measured affects the amount of radiation impinging upon the radiant energy electric generator, disposing a second radiant energy electric generator relative to a source of ionizing radiation so that the radiant intensity impinging upon it is attenuated by a standard value of the variable condition connecting the first radiant energy electric generator and the second radiant energy electric generator in parallel opposed relationship whereby a net output signal is produced which is dependent upon the deviation of the variable condition from its standard value, applying said net output signal to a device for controlling said variable quantity whereby said variable quantity is made to more nearly conform to its standard value.

17. A method of measuring a variable condition, which method comprises arranging a first radiant energy electric generator with respect to an associated source of ionizing energy so that said variable condition is effective to attenuate the intensity of the energy impinging upon said generator from the source, connecting a second radiant energy electric generator in parallel opposition with the first generator, arranging said second radiant energy electric generator with respect to a predetermined value of said variable condition and a source of ionizing energy, whereby the ionizing energy impinging upon said generator is attenuated, operating said first and second generators under the influence of substantially similar extraneous factors, the first generator developing an output signal varying in accordance with the variable condition and the second generator producing a signal output corresponding to a reference value of the variable condition, the output signal of said second generator also being effective to compensate for any changes in the extraneous factors affecting said first generator, comparing the output signal of the two generators and employing any unbalance to operate a mechanism for indicating the divergence of the variable condition from its reference value.

18. Apparatus for analyzing the composition of a quantity of gas, said apparatus comprising a measuring radiant energy electric generator and a compensatory radiant energy electric generator connected in parallel opposed relationship, a source of ionizing radiation associated with each of said generators, said compensatory generator having a filling gas constituted by a gas of known composition, said measuring generator being provided with means for introducing therein the gas to be analyzed, means for measuring the net output signal of said generators as a measure of the variance of the unknown gas from the composition of the gas in said compensatory generator.

19. Apparatus for measuring film thickness, said apparatus comprising a measuring radiant energy electric generator and compensatory radiant energy electric generator, a source of ionizing radiation associated with each of said generators, said generators being connected in parallel opposed relationship, a film of standard thickness, said compensatory generator being disposed relative to its associated source of radiation whereby energy is back-scattered from the film of standard thickness onto the compensatory generator, said measuring generator being disposed relative to its associated source of radiation so that energy is back-scattered from the film whose thickness is to be measured onto said generator, and means for measuring the net output signal of said generators as a measure of the disparity of said variable film thickness from said standard film thickness.

20. A method of measuring the level of material within a container, said method comprising connecting two radiant energy electric generators in parallel opposed relationship, disposing said generators relative to the level of ionizing the material being measured and a source of radiation whereby the material being measured attenuates the energy impinging upon said generators by an amount dependent upon the height of the material, comparing the output signals of said generators and employing any unbalance to operate a mechanism for indicating the level of said material.

21. A method of measuring density, said method comprising, disposing a first radiant energy electric generator relative to a source of ionizing radiation so that the material whose density is to be measured attenuates the radiation impinging upon said generator, disposing a second radiant energy electric generator with respect to said source of ionizing radiation so that the intensity of the radiation impinging upon said second generator is not affected by the material whose density is being determined, and connecting the first generator and the second generator in parallel opposed relationship whereby a net output signal is produced by said generators, which signal is dependent upon the density of said material, and measuring said net output signal to indicate the value of said density.

22. A level measuring device comprising a pair of radiant energy electric generators connected in parallel opposition, said generators respectively having portions exposed to a source of ionizing energy, said generators being arranged at different heights with respect to the level of the material being measured, the upper surface of said material being disposed between said generators and the source of ionizing energy so that the intensity of the energy impinging upon said generators is attenuated by said material to an extent dependent upon the height of said material, the exposed portions of said generators being so configurated that a change in material level will cause the energy impinging upon each of said generators to be changed by different amounts, and means for measuring the net output signal of said generators as an index of the material level.

23. A level measuring device comprising a pair of radiant energy electric generators connected in parallel opposition, a source of ionizing energy, said generators respectively having portions exposed to the source of ionizing energy, a shield constituted by a material substantially impervious to radiant energy disposed intermediate one of said generators and said source, the exposed portions of said generators being arranged at substantially the same height as the level of the material being measured so that the intensity of the energy impinging upon said generators is attenuated by said material to an extent dependent upon the height of said material, the exposed portions of said generators being so configured that a change in material level will cause the energy impinging upon each of said generators to be changed by different amounts, and means for measuring the net output signal of said cells as an index of the material level.

24. A method of measuring the level of material within a container, said method compising connecting two radiant energy electric generators in parallel opposed relationship, disposing said generators relative to a source of ionization radiation whereby the material being measured is disposed intermediate said generators and said source, said generators being disposed at substantially the same height as the upper surface of said material so that said material attenuates the energy impinging upon said generators in an amount dependent upon its level, comparing the output signals of said generators and employing any unbalance to operate a mechanism for indicating the level of said material, the portion of said cells exposed to the source being so configurated that for a predetermined level the net output of the two generators is zero and for any other level it reaches a unique value.

25. The method of making relative quantitative measurements of any factor which modifies the intensity of a radioactive field at a point spaced from the source of said radioactivity, said method comprising, connecting two radiant energy electric generators together in short-circuited relationship whereby the positive electrode of one generator is connected to the negative electrode of the other generator and vice versa, energizing both generators by radiation from one or more sources of radioacivity, modifying the radioactive field of one generator differentially in relation to the modification of the radioactive field of the other generator and measuring a characteristic of the change in the current which flows between said short-circuited connections as a result of said modifying the radioactive field of one generator differentially in relation to the modification of the radioactive field of the other generator.

References Cited in the file of this patent

UNITED STATES PATENTS

| | | |
|---|---|---|
| 2,264,725 | Shoupp et al. | Dec. 2, 1941 |
| 2,285,840 | Scherbatskoy | June 9, 1942 |
| 2,375,130 | Perrin et al. | May 1, 1945 |
| 2,394,703 | Lipson | Feb. 12, 1946 |
| 2,586,303 | Clarke | Feb. 19, 1952 |
| 2,647,214 | Penney et al. | July 28, 1953 |

OTHER REFERENCES

A New Electronic Battery—from the "Electrician," vol. 10, October 13, 1924, page 497.